(12) United States Patent
Geddes et al.

(10) Patent No.: US 7,043,230 B1
(45) Date of Patent: May 9, 2006

(54) METHOD AND SYSTEM FOR MULTI-NETWORK AUTHORIZATION AND AUTHENTICATION

(75) Inventors: Martin Geddes, Overland Park, KS (US); Farni Weaver, Spring Hill, KS (US); Piyush Jethwa, Overland Park, KS (US); Christopher Ginn, Mission, KS (US); Von McConnell, Leawood, KS (US); David Anderson, Seattle, WA (US)

(73) Assignee: Sprint Spectrum L.P., Overland Park, KS (US)

( * ) Notice: Subject to any disclaimer, the term of this patent is extended or adjusted under 35 U.S.C. 154(b) by 231 days.

(21) Appl. No.: 10/370,374

(22) Filed: Feb. 20, 2003

(51) Int. Cl.
*H04M 3/16* (2006.01)

(52) U.S. Cl. .................. 455/410; 455/411; 455/450; 709/237; 709/228; 713/184; 713/201

(58) Field of Classification Search ............... 455/410, 455/411, 466, 450, 454; 709/237, 228, 227; 713/184, 201, 202
See application file for complete search history.

(56) References Cited

U.S. PATENT DOCUMENTS

| 6,430,407 | B1 | 8/2002 | Turtiainen | |
|---|---|---|---|---|
| 6,853,977 | B1* | 2/2005 | Niwa | 705/21 |
| 2003/0046556 | A1* | 3/2003 | Attwater et al. | 713/186 |
| 2003/0096626 | A1* | 5/2003 | Sabo et al. | 455/466 |
| 2003/0158960 | A1* | 8/2003 | Engberg | 709/237 |

OTHER PUBLICATIONS

Young, "Authentication with SMS," Wireless Review (Jun. 15, 2001). (www.wirelessreview.com/ar/wireless authentication>sms/).

* cited by examiner

*Primary Examiner*—Danh Cong Le

(57) ABSTRACT

A system for authenticating and/or authorizing users of a service includes one communication interface with an access communication channel and another communication interface with a confirmation communication channel. Requests for a user to access a service are received over the access communication channel, and confirmation codes for the user are received over a trusted confirmation channel, such as an SMS text messaging system. Confirmation codes may be received from the user requesting access to the service or by a third party acting as a gatekeeper to the service. The system tests the validity of received confirmation codes, and enables the user to access the service if a valid confirmation code is received.

49 Claims, 4 Drawing Sheets

METHOD AND SYSTEM FOR MULTI-NETWORK AUTHORIZATION AND AUTHENTICATION

BACKGROUND OF THE INVENTION

1. Field of the Invention

The present invention relates to telecommunication services and more particularly to a method and system for using a telecommunications channel to provide authentication or authorization for users of a service.

2. Description of Related Art

Cellular wireless is an increasingly popular means of communication, as it offers users the opportunity for secure exchange of voice and data information using a mobile station ("MS"), such as a cellular telephone. In principle, a user equipped with a MS can seek information over the Internet or call anyone over a Public Switched Telephone Network ("PSTN") from anywhere within the coverage area of the cellular wireless network. Security of communications using a cellular wireless network is maintained through, among other things, the use of spread-spectrum transmission techniques such as code-division multiple access (CDMA). Moreover, individual mobile stations include an electronic serial number ("ESN") hard-coded into the circuitry of each MS to make it extraordinarily difficult to fraudulently mimic the identity of a MS.

One popular service offered for users of cellular wireless communications, and particularly users of a personal communications service ("PCS"), is the short message service ("SMS"). The SMS is a service implemented over a cellular wireless network for sending short text messages over the network between stations called short message entities through a message center ("MC"). A short message entity is often, but not necessarily, incorporated in a cellular phone or other MS. Short message entities may be implemented, for example, over an Internet protocol ("IP") network or other network. In general, the SMS service may allow a person to type in a desired text message, indicate the directory number associated with a destination mobile station, and then transmit an SMS message encapsulating the desired text message. The telecommunications network then conveys the text message to the destination mobile station, where the message is typically displayed for receipt by an end user. SMS messaging is described in, for example, Gallagher & Snyder, "Mobile Telecommunications Networking with IS-41" (1997), 285–310 and may be compliant with an industry standard such as the Telecommunications Industry Association (TIA)/Electronics Industry Association (EIA) Interim Standard IS-637A ("Short Message Service for Spread Spectrum Systems"). Other messaging services are Session Initiation Protocol (SIP) instant messaging and wireless application protocol (WAP) push. SIP is described in, for example, IETF RFC-3261 (June 2002), and WAP push is described in, for example, "WAP Push Architectural Overview," WAP-250-PushArchOverview-20010703-a, ver. 03 (July 2001).

With the increasing use of automated communication services of all kinds, whether wired or wireless, sensitive transactions are increasingly carried out over these communication services. For example, consumers and business often perform banking transactions over the Internet or at an automated teller machine (ATM), which itself is a communications terminal tied with the bank's central computing system. Purchases are often made with credit cards over e-commerce Web sites. Employees use the Internet to log in to their company's Web site to access confidential information related to their work. In all of these situations, it is desirable to authenticate the user by verifying the identity of a user before providing the user with access to the service. To verify the user's identity, the user must often provide a username and password over the same communication channel he or she will use to access the service. In the case of an ATM, the combination of an ATM card and personal identification number ("PIN") is used to verify the identity of a user. In these systems, any fraudulent user who learns a username and password can access restricted services over the Web, and a thief who takes an ATM card and learns the PIN of the owner can make banking transactions using the card, including withdrawing cash from the owner's account.

SUMMARY OF THE INVENTION

A system for authorizing or authenticating users of a service includes a first communication interface with an access communication channel and a second communication interface with a confirmation communication channel. The confirmation channel is preferably a secure communication channel and may be different from the access communication channel. The system includes service control logic that is in communication with the first communication interface. The service control logic receives access requests associated with a user requesting access to the service. The system further includes access control logic that is in communication with the second communication interface and that sends or receives a confirmation code through the second communication interface. The access control logic may test the received confirmation code for validity, for example, by determining whether the received confirmation code is a valid password associated with the user. The service control logic enables the user to access the requested service only after it is determined that the received confirmation code is a valid confirmation code.

The second communication interface preferably includes a short message entity for receiving SMS messages that include the confirmation code. When access requests include a user identifier, the access control logic may retrieve a confirmation-channel address from user data storage and send a request for a confirmation code to that address. Where the second communication interface includes a short message entity, the confirmation-channel address may be a telephone number of the user's mobile phone, and the access control logic may send an SMS message requesting a confirmation code to the user's mobile phone.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
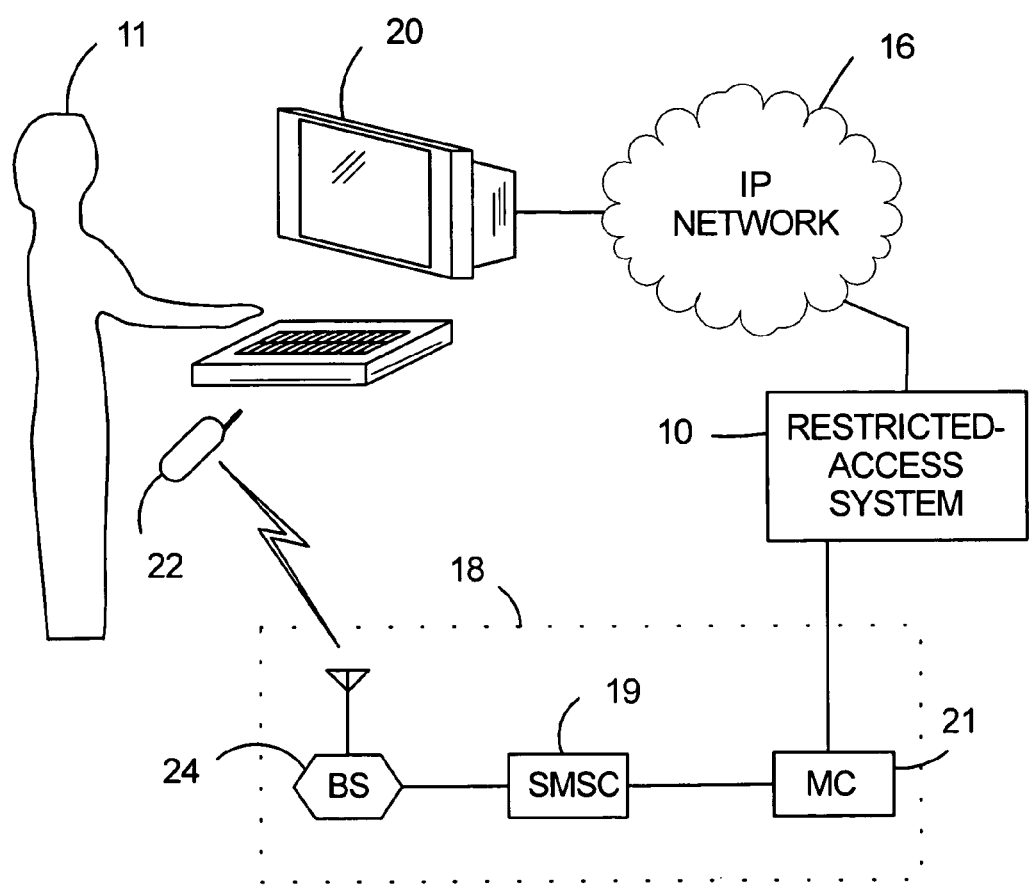
FIG. 1 is a block diagram illustrating an exemplary use of a restricted-access system 10 with an IP network and an SMS messaging system.

FIG. 1 depicts a network architecture employing a system 10 for providing access to a service to authorized users while preventing access by unauthorized users. The system 10 has interfaces to two channels of communication for communicating with prospective users: an access channel 16 and a confirmation channel 18. A prospective user 11 of the system is provided with a first communication terminal 20 for communicating over the access channel 16 and a second communication terminal 22 for communicating over the confirmation channel. When the user wishes to gain access to a service offered through the restricted-access system 10, the user sends a request for access to the system 10 over the access channel. The system 10 receives the request for access and, in response to the request for access, sends a request for confirmation to the user over either the access channel 16 or the confirmation channel 18. In response to the request for confirmation, the user sends a confirmation message to the service provider over the confirmation channel 18. The system 10 receives the confirmation message and determines whether the user has sent a valid confirmation code. If the user has provided a valid confirmation code, the system 10 provides the service to the user.

The operation of the restricted-access system 10 in a network may be understood by the exemplary case in which the access channel 16 includes a packet-switched data network, such as the Internet or another IP network, the system 10 operates a restricted-access Web site, and the confirmation channel 18 includes mobile telecommunications network with a text messaging function, such as SMS messaging. The first communication terminal 20 is a personal computer loaded with Web browser software, and the second communication terminal 22 is a short message entity such as a mobile phone with SMS capability. The user requests access to the Web site by, for example, following a link or typing in the URL of a home page of the Web site at the personal computer 20. Before allowing the user access to the restricted portions of the Web site, the system 10 requests the user to send a confirmation code, such as a password, via an SMS message. The request for confirmation may itself be sent as an SMS message to the user's mobile telephone 22.

The user enters the password into his or her mobile phone and sends the password as an SMS message to the system 10. Where, as in this example, the confirmation channel 18 is an SMS system and the user employs a mobile telephone to communicate over the channel 18, the channel 18 includes one or more base stations 24 ("BS") for maintaining radio communications with mobile telephone 22, a serving mobile services switching center ("SMSC") 19 for coordinating communications with the various base stations, and a message center ("MC") 21 with store-and-forward capability for ensuring that SMS messages are directed to their intended recipient.

When the system 10 receives the SMS message containing the password, it interprets the message to determine the sent password (for example, by removing whitespace and extraneous addressing information), and tests whether the password sent by the user is a valid password. If the password is a valid password, the service provider is directed to provide the user with access to the restricted-access Web site.

Figure 2:
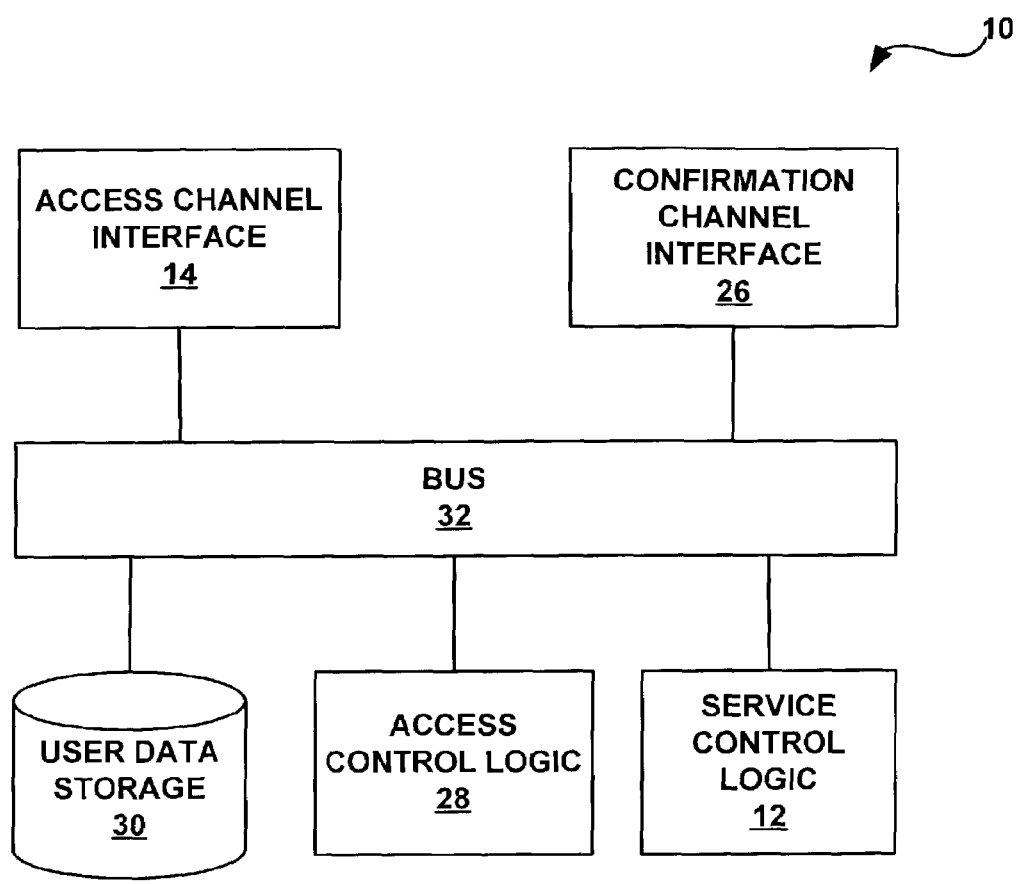
FIG. 2 is a block diagram illustrating an exemplary embodiment of the invention.

The components of the restricted-access system 10 are illustrated in FIG. 2. The system 10 includes service control logic 12 for offering a service to a user. The service control logic 12 may operate by itself providing a service to the user. In that case, the service control logic 12 may include, for example, an HTTP server software program, or logic to operate transactions at an ATM. Alternatively, service control logic 12 may act as a gate by, for example, sending a message to an external service provider (not shown) confirming or denying that a user is entitled to access the service. In that case, the service provider then refuses to provide access by a user to a particular service until the service control logic system 10 sends a message to the service provider confirming that the user is authorized to access the service. In another embodiment, the service control logic 12 acts as a channel through which a service is provided. In that case, the service control logic 12 may include, for example, software for operating a proxy server or portal server, a firewall, or switch, or network node that permits or restricts communications between a user and a service (such as an HTTP server) depending on whether the user is properly authenticated and/or authorized to access the service.

System 10 may, in some embodiments, be useful for providing restricted access to users of a service who may need to access the service from an untrusted terminal, such as an Internet terminal at a library or an "Internet cafe."

The system 10 further includes an access channel interface 14 for connecting the system 10 with the access communication channel 16 and a confirmation channel interface 26 for connecting the system 10 with the confirmation communication channel 18. The access channel interface 14 receives requests for access to the service offered through the service control logic 12. The access channel interface 14 may be, for example, a network interface card or a modem. The confirmation channel interface 26 is preferably a short message entity, but may be an interface with any other trusted communication channel. The confirmation communication channel 18 is preferably a different communication channel from the access communication channel 16, i.e., the different channels are sent over different media, implemented in different networks, and/or directed to different user communication terminals 20, 22. Accordingly, the confirmation channel interface 26 is preferably connected to a different communication channel from the access channel interface 14. The confirmation communication channel 18 is preferably—but need not be—a more secure channel than the access communication channel 16. For example the confirmation channel 18 may include CDMA radio transmissions, while the access channel 16 includes transmissions over the public switched telephone network (PSTN). These different channels may be carried over the same medium. It is preferable, but not necessary, that the access channel 14 be a channel over which a rich user interface may be provided for a good user experience. The availability or a rich user interface is less important for the confirmation communication channel 16, which may be readily implemented by simple protocols such as SMS, instant messaging (over SIP or otherwise), WAP push, or HTTP POST messages.

Access control logic 28 handles access requests received over the access channel interface 14, initiates requests for confirmation, and tests confirmation messages received through the confirmation channel interface 26 for valid confirmation codes. To test the validity of a confirmation code received over the confirmation channel interface 26, the access control logic may make use of user data storage 30. The user data storage 30 includes records for authorized users including user identifiers and confirmation codes associated with user identifiers. When the access control logic 28 handles a request for access that includes a user identifier (for example, a username, an SMS address, an IP address, or other code that identifies the user requesting access), the access control logic 28 retrieves a confirmation channel address, such as an SMS address, from the user data storage 30 and sends to the user a request for a confirmation code. When a confirmation message is received at the confirmation channel interface 26, the access control logic 28 tests the received confirmation message for the presence of a valid confirmation code by comparing the received confirmation message with the confirmation code associated with the user identifier in the user data storage 30. Other known methods of testing the validity of a confirmation code may be employed that do not necessarily make use of a comparison with a stored confirmation code.

The access channel interface 14, the confirmation channel interface 26, the user data storage 30, the access control logic 28, and the service control logic 12, communicate over a data bus 32 and are operated by a processor (not shown). The access control logic 28 and the service control logic 12 may include machine language instructions saved in data storage such as computer RAM. It should be noted that, although the use of a bus to communicate between logical modules is preferable when all modules are implemented within the same computer, one or more of these modules may be implemented in different computers, with different processors, communicating over a network.

Figure 3:
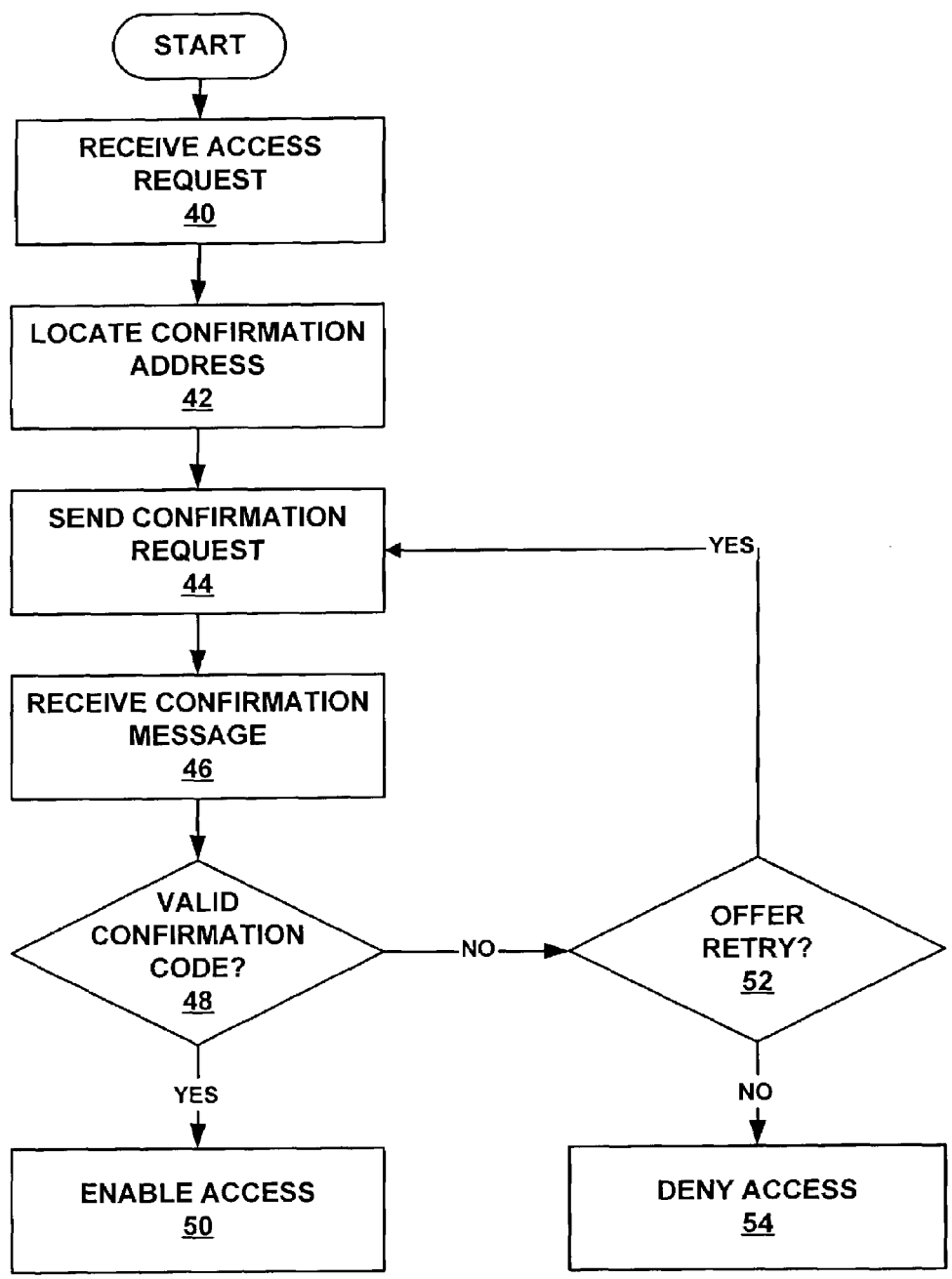
FIG. 3 is a process flow diagram illustrating an exemplary process for the operation of the system of FIG. 2.

The operations performed by the system 10 are set out in the flow chart of FIG. 3. In step 40, the system receives a request for access to the service over the access channel. The request for access may be, in the case of a restricted-access Web site, an HTTP request encapsulating a username and/or password. Alternatively, where the service is an ATM, the access request may be a message automatically sent by the ATM when, for example, the user inserts his or her card and enters a PIN. The request for access may alternatively be a request for a network layer connection, such as an IP connection, as may be employed by a user attempting to access a virtual private network (VPN).

At step 42, the system 10 accesses the user data storage 30 to locate a confirmation-channel address associated with the access request. Where the confirmation channel makes use of SMS messaging, the confirmation-channel address is preferably a telephone number associated with a user's MS. Where the confirmation channel includes a presence service, the confirmation-channel address may be an unresolved address that is resolved by the presence service, permitting the user to be located at one of several addresses. The RFCs "A Model for Presence and Instant Messaging," RFC-2778 (February 2000), and "Instant Messaging/Presence Protocol Requirements," RFC-2779, (February 2000), describe the use of a presence service. Alternatively, the user data storage may store a multitude of confirmation-channel addresses, with each address being associated with one or more users. In that case, when the access channel interface 14 receives an access request that includes a user identifier, the access control logic may query a database to locate the confirmation-channel address associated with that user identifier.

The system then sends a confirmation request at step 44 asking the user to send the confirmation code over the confirmation channel. The confirmation request is preferably sent by the confirmation channel interface 26. For example, where the confirmation channel is an SMS system, the confirmation request may be sent by the confirmation channel interface 26 as an SMS message to the user's mobile phone 22. An exemplary confirmation request for a user with the identifier "jsmith" attempting to access a restricted Web site would appear as follows:

Access requested by jsmith to service.net. Please send confirmation code to verify.

An exemplary confirmation request for a user attempting to access a restricted Web site would appear as follows:

Access requested to account of J. Smith. Please send confirmation code to verify.

After sending the confirmation request, the system receives the confirmation message from the user at step 46 over the confirmation channel. If a confirmation message is not received before a specified time has elapsed, the system may time out without providing access.

Where the user is equipped with a MS that includes a two-way short message entity, the confirmation request is preferably sent to the user as an SMS message, and the user may send the confirmation code by sending a reply to the SMS confirmation request message with the confirmation code in the text of the reply message. Alternatively, the user may enter an SMS address of the system's short message entity manually or from a directory saved in the user's MS. In another embodiment, the confirmation request includes a callback telephone number, and the user may use a telephone (preferably a mobile telephone with an integrated short message entity) to dial the callback number and then speak the confirmation code (e.g., as a password or a series of numbers or characters) into an automated answering system.

Once the confirmation code has been received, the system performs any necessary parsing or interpretation of the confirmation message, for example, by removing extraneous whitespace or address information in the message, or by converting the case of the message text if the confirmation code is not case-sensitive. If the confirmation code is spoken over a telephone line, the system employs voice recognition to interpret the spoken confirmation code.

The system tests the code at step 48 to determine whether it is valid. To test the code's validity, the access control logic 28 compares the code received from the user with a valid confirmation code stored in the user data storage 30 and associated with the user identifier. Of course, the confirmation code may be stored in an encrypted format. If the confirmation code is valid, the system provides access to the service at step 50. This may be accomplished by, for example, the access control logic 28 sending a validation message to the service control logic 12.

If the confirmation code is not valid, the access control logic determines at step 52 whether or not to offer the user another chance to send a valid confirmation code. The user may be offered a fixed number of attempts or a limited amount of time to enter a valid code before the system denies access at step 54 for unauthorized users.

To assist in requesting confirmation messages and testing confirmation messages for validity, the user data storage 33 includes a database with a record corresponding to each authorized user of the system. Each record includes the user identifier, a valid confirmation code associated with the user identifier, and (if confirmation requests are sent over the confirmation channel) the confirmation-channel address associated with the user identifier. Different confirmation-channel addresses may be employed for different services requested by the user.

Where the service is a restricted-access Web site and the confirmation-channel address is a telephone number corresponding to a user's SMS-enabled mobile phone, a simple set of database entries in the user data storage 33 would appear as follows:

| USERNAME | CONFIRMATION-CHANNEL ADDRESS | CONFIRMATION CODE |
|---|---|---|
| user24 | 312-555-6427 | wqke234 |
| acct2002 | 514-555-2456 | rtkl3xy |
| anon | 905-555-6704 | h2gej4e |

The user identifier may take one of several different forms, so long as the identifier is sufficient to identify authorized users of the system. The user identifier may be, for example, a username, password, or PIN. The user identifier does not need to be consciously known to the user; it may be, for example, a code associated with a token in the user's possession (such as code electronically or magnetically recorded on an ATM card, credit card, or smart card), an identifier associated with the access channel (such as the user's IP address in the case of Internet communications or telephone number in the case of telephonic communications). Of course, the user identifier may be comprised of a combination of any of the above. The user identifier is not necessarily unique for each user; a group of users (for example, all users employed at a branch office location) could have the same user identifier. The user identifier is preferably stored in advance the user data storage 30, but access control logic 28 may be arranged to permit access to users for whom no identifier is stored in the user data storage 30. That would be the case when, for example, the system is designed to restrict access not only to previously-authorized users, but also to users who register for the first time by providing an identifier to the system.

The confirmation code may be a password known to the user. The confirmation code may alternatively include biometric information such as an eye scan or fingerprint read by the user's confirmation communication terminal 22. The confirmation code may include an identifier associated with the confirmation channel, such as an identifier uniquely associated with a user's mobile telephone when the confirmation channel makes use of SMS messaging. For example, when an SMS message is sent by an originating short message entity to the destination short message entity, the message received at the destination short message entity—called SMD-ACK—includes data called the "OriginalOriginatingAddress" that identifies the originating short message entity. Thus, where SMS is used in the confirmation channel, the confirmation code can include the OriginalOriginatingAddress of the user's short message entity. The access control logic 28 may use the OriginalOriginatingAddress to verify that a confirmation code sent by SMS messaging was sent by the telephone of the authorized user. Of course, the confirmation code may include a combination of different types of codes, such as a password together with the user's confirmation channel address or a personal identification number together with biometric data. Preferably, the confirmation code used by the system includes a pass code consisting of one or more letters and/or characters physically entered, through a keypad, microphone, or otherwise, by the user into the user's confirmation communication terminal 22.

In addition to—or as an alternative to—the user data storage 30, the system 10 can make use of a trusted directory service, such as an electronic telephone directory, to associate a user's identifying information with a confirmation-channel address. This may be used, for example, when the step 48 of determining whether a user is authorized involves comparing a name given by the user and the OriginalOriginatingAddress of an SMS message sent by the user with the name and corresponding telephone number stored in a trusted telephone directory service.

Instead of confirmation codes permanently (or semi-permanently) assigned to particular users, the system may make use of a pass code generated randomly (or selected from a list of confirmation codes) for use with a particular transaction. For example, to authenticate a user attempting to reach a restricted-access Web page on a Web site, the Web page can display a pass code on the user's personal computer 20. The system also sends a message to the user's mobile phone 22 requesting a pass code. The user enters the pass code displayed in the Web page into mobile phone 22 and sends the pass code in a reply message to the system. As an alternative, if the system does not send a message to mobile phone 22, the user may send the pass code to the system as a standalone message, rather than as a reply. In another embodiment, the user may access a confirmation Web page over a Web-enabled mobile device, such as a PCS phone, and enter the pass code in a form on the confirmation Web page. The pass code may then be sent over the confirmation channel as, for example, an HTTP POST message. The system may simplify access to the confirmation Web page by redirecting the user to a specialized confirmation Web page when the user enters a URL of the service or selects a link to the service.

In another alternative, the system may send a pass code to the user as a message to the user's mobile phone 22, and the user then sends the pass code to the system by personal computer 20. Thus the, system may send a pass code to the user by either one of the channels (the access channel or the confirmation channel), the user sends the same pass code back to the system over the other of the two channels, and the system checks the pass code for validity.

In the embodiment in which the user receives a pass code over one channel and sends the pass code over the other channel, a restricted-access Web site may display for the user text including a pass code once the user as entered his or her user identifier. The user may then receive a message such as the following over the confirmation channel interface:

Access requested by jsmith to service.net. Please enter code displayed in Web browser to verify.

If the user accesses a confirmation Web page over a Web-enabled mobile device, the text of the confirmation Web page may contain a similar instruction, and include a form for the confirmation code, together with a "send" or "submit" button. Once the user has sent a pass code, an interstitial message such as "Waiting for Authentication" may appear on one of the user's terminals 20, 22.

In some instances, a user may already have undergone security procedures, such as a password-protected logon, simply to open communications over the confirmation communication channel, even before requesting access to the service. In that case a valid confirmation code requested by the system may be nothing more than an "okay" or "yes" message or other similarly uncomplicated confirmation code.

The system has thus far been described primarily by means of the embodiment in which it is used to authenticate users requesting access to a service. In that case, the access communications and the confirmation communications are preferably directed to the same user. In an alternative embodiment, however, the access communications and the confirmation communications need not be directed to the same user. In this way, the system can be used to confirm that a user is authorized to access a service or to conduct a particular transaction on the service. For example, one user may attempt to access a service by entering an identifier over the access channel. The service provider then requests a confirmation code from an authorizing party and awaits a correct confirmation code from the authorizing party before allowing the user access to the service. In this case, the authorizing party can serve as a gatekeeper who is informed of and controls others' access to the service. This embodiment may be used on its own or in combination with an embodiment in which an individual is authenticated through access communications and confirmation communications directed to the same user to provide additional security where both authentication and authorization are required.

In one embodiment, rather than requesting a confirmation code from each individual user, the system requests a confirmation code from a gatekeeper. In that way, the gatekeeper is kept apprised of efforts by users to access the service and can control access by users to the service. For example, the service could be ATM access for a corporation, where multiple users are provided with an ATM card. Whenever a user attempts to access the ATM, the system sends a request for a confirmation code to a single authorized individual, such as a corporate comptroller, serving as a gatekeeper. If the user is authorized to conduct a transaction, the gatekeeper sends a confirmation code back to the system, and the user is permitted to conduct the transaction.

One or more confirmation-channel addresses of gatekeepers may be associated in the user data storage 30 with each user identifier. More than one confirmation-channel address may be associated with a user to provide alternate means of contacting a single gatekeeper, to increase security by requiring approval by more than one gatekeeper, or to provide alternate a access to a different gatekeeper in case one gatekeeper is not available. Alternatively, a confirmation-channel address associated with a gatekeeper may be an unresolved address of a class of gatekeeper users having a particular role (such as corporate executives or high-level engineers) for role-based authentication. Moreover, the confirmation-channel address may differ for different services sought by the same user, so that the confirmation-channel address will direct a confirmation code request to a gatekeeper appropriate to the requested service. A message sent by a gatekeeper in response to a confirmation code request need not be limited to a confirmation code alone. It may contain, for example, a denial code together with a text message including reasons for the approval or denial.

When a user is required to await authorization from a gatekeeper, an interstitial screen is preferably displayed on the user's access communication terminal 20 (FIG. 1) with a message such as "Waiting for Authorization." Where the access communication terminal 20 includes a Web browser the interstitial screen may operate by directing the user to an interstitial Web page after the user enters the access request. The interstitial Web page displays the "Waiting for Authorization" message and includes a MIME document header with a "Refresh" directive, directing the user's Web browser to reload the interstitial Web page periodically. Each time the user's Web browser requests the interstitial Web page, the system checks whether a confirmation message has been received from the gatekeeper. If the confirmation message from the gatekeeper includes a valid confirmation code, the user is redirected to a service Web page where the user can access the service. Alternatively, if the gatekeeper sends a denial code, or if no response at all is received from the gatekeeper after a predetermined amount of time has passed, the user is redirected to a Web page displaying a message such as "Access Denied."

In one embodiment employing a gatekeeper, the service is a supply-ordering service implemented on a network, and the service communication channel may be a corporate intranet. Such an embodiment may be implemented by, for example an airline maintenance employee who believes that a replacement should be ordered for a worn or defective part. To initiate the order process, the maintenance employee accesses the intranet using a browser and enters a request for the new part. The request may include, for example, information identifying the maintenance employee, information identifying the part requested and the aircraft for which the part is needed, and information identifying the reasons a replacement part is needed. Upon receiving the request for a new part, the system may determine whether the transaction requested is a transaction requiring authorization, for example, by determining whether the part requested is above a particular price. If the system requires authorization for the transaction, it sends a confirmation request to a gatekeeper, such as a senior engineer specializing in the relevant aircraft type or part and/or assigned in a supervisory role over the particular maintenance employee. The confirmation request may be sent as, for example, an SMS message including information entered by the maintenance employee. Alternatively, the message could be sent as an SIP instant message. After reviewing the message to determine whether the order should be placed, the senior engineer sends a reply message (via SMS or SIP). The reply message may contain a valid confirmation code. Alternatively, the message may contain a denial code and additional information, such as the reasons for denying the request, or suggestions for an alternative course of action.

While the maintenance employee awaits authorization from the gatekeeper, the system may send an interstitial message such as "Approval is Pending" (for example, in an interstitial Web page as described above) for display to the user until approval is received. If approval is denied, the system may send a message to the user explaining the reasons for denial. Otherwise, if a valid confirmation code is received, the system permits the user to complete the transaction to order the part.

The system 10 may be embodied as a confirmation server, wherein the functions of the access channel interface 14 are performed by a system separate from the service provider. In that case, the service provider need not be concerned with the details of implementing the confirmation process described above. For example, the confirmation server may be implemented in a network node along an access channel associated with a user or with the service provider. When a user requests a service (such as access to a Web site) over an access channel associated with the service, the network node 68 intercepts the user request and queries the service control logic 12 using a user identifier to determine whether the user identified is permitted access to the service. If the service control logic 12 has not yet granted access to the user (e.g., the user has not yet initiated a valid session), the service control logic 12 calls the access control logic 28 to authenticate the user. Once the user has been authenticated as described above, the access control logic 28 returns a value or message to the service control logic 12, which then enables the user to access services through the network node of the access channel interface 14. Of course, the network node may be protected with its own layer of security, for example requiring a valid username and password before the network node queries service control logic 12 for confirmation.

Figure 4:
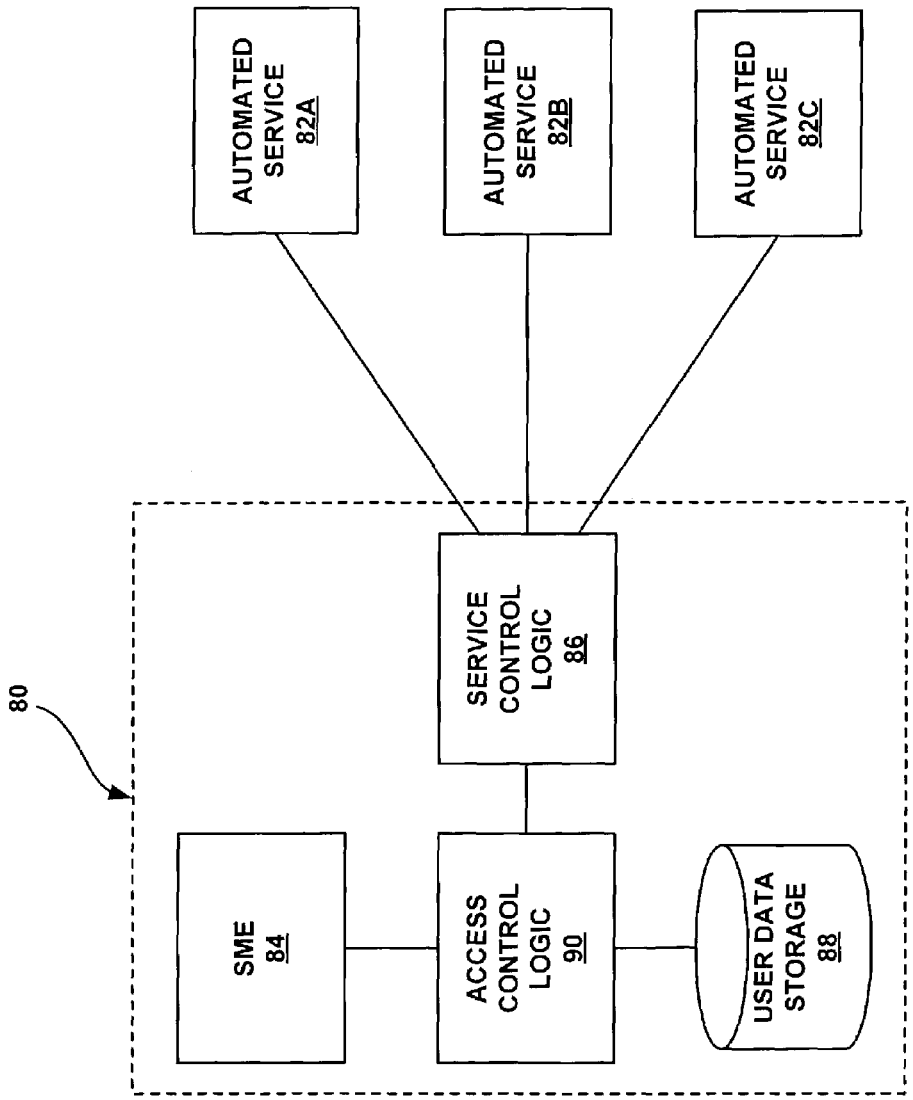
FIG. 4 is a block diagram of a confirmation server in communication with multiple services in accordance with another exemplary embodiment of the present invention.

As illustrated in FIG. 4, a confirmation server 80 may be operated to control access to one or more different services 82A, 82B, 82C. The confirmation server 80 includes a confirmation channel interface such as a short message entity 84. The service control logic 86 manages access requests from each of the services 82A–C. In this way, the same confirmation server may be used to restrict access to, for example, several different Web sites, or several ATM machines. The user data storage 88 associates user identifiers with different services, so that users may be granted access only to selected services, and users may have different confirmation codes (or even different user identifiers) for different services. The access control logic 90 operates to determine whether confirmation codes received over the confirmation channel interface 84 are valid confirmation codes associated with the users requesting access and with the service to which the user is requesting access.

The confirmation server may be implemented as a node in a packet switched network, a telephone network, an ATM network, or other network, where the confirmation server intercepts a request for access to a service (for example, an effort to enter a secured Web page, to dial a particular telephone number, or to access a bank account), or a request to conduct a particular transaction (such as placing an order or making a withdrawal). The intercept may take place by, for example, monitoring a communications stream for a particular series of bits, for example, bits comprising an HTTP "GET" request for a particular Web page, or by monitoring for requests by particular users. Some users, for example, may require authorization while others do not. The service provider informs the confirmation server how an intercept is conducted (e.g., by providing a list of URLs for restricted Web pages). As an alternative, the service provider—rather than the confirmation server—intercepts access requests. Once an access request is intercepted, the service provider sends a request to the service control logic of the confirmation server to authenticate the identity of the user requesting access and/or to determine whether the user is authorized, as described above. Once the system authenticates the user and/or determines that the user is authorized to access the service, the system sends an authentication and/or authorization message to the service, indicating to the service that the user has been authenticated and/or authorized to access the service.

In an alternative embodiment, the access control logic 90 does not itself test the received confirmation codes for validity; rather the access control logic 90 of the confirmation server formulates a message including the received confirmation code, which is sent by the service control logic 86 to the appropriate one of the services 82A–C. Each individual service may then test the received confirmation code for validity. In this way, the confirmation server 80 avoids the logistical difficulties and potential security risks of keeping track of all valid confirmation codes for the services 82A–C.

Exemplary embodiments of the present invention have been illustrated and described. It will be understood, however, that changes and modifications may be made to the invention as described without deviating from the spirit and scope of the invention. For example, various forms of messaging, such as instant messaging (SIP or otherwise) or WAP push, and other forms of communication (such as voice over IP) may be used in place of the exemplary SMS messaging described above.

The invention claimed is:

1. An authorization system comprising:
    a first communication interface connectable to an access communication channel;
    a second communication interface connectable to a confirmation communication channel;
    service control logic in communication with the first communication interface for receiving through the first communication interface an access request associated with a first user;
    user data storage including a plurality of confirmation-channel addresses, wherein each confirmation-channel address is associated with one or more users, wherein a selected confirmation-channel address is associated with the first user, and wherein the selected confirmation-channel address is a confirmation-channel address of a second user different from the first user;
    access control logic in communication with the second communication interface for sending a confirmation request to the second user at the confirmation-channel address.

2. The system of claim 1 wherein the access control logic includes logic for intercepting request messages and for testing request messages for requests requiring authorization.

3. The system of claim 1 wherein the access control logic is operative to receive a confirmation message from the second user and to test the received confirmation message to determine whether the received confirmation message includes a valid confirmation code.

4. The system of claim 1 wherein the access control logic is operative to receive a confirmation message from the second user, the service control logic being operative to enable the first user access to a service only after the access control logic has received a confirmation message from the second user.

5. The system of claim 1 wherein the confirmation message is received by the access control logic through the second communication interface.

6. The system of claim 1 wherein the service control logic is operative to enable the first user access to a service only after the access control logic determines that the received confirmation message includes a valid confirmation code.

7. The system of claim 1 wherein the service control logic is operative to provide a service to the first user only after the access control logic determines that the received confirmation message includes a valid confirmation code.

8. The system of claim 1 wherein the service control logic is operative to send an authorization message to a service provider to inform the service provider that the first user is authorized to access the service only after the access control logic determines that the received confirmation message includes a valid confirmation code.

9. The system of claim 1 wherein the confirmation request identifies the first user to the second user.

10. The system of claim 1 wherein the confirmation request includes a request for a password.

11. The system of claim 1 wherein the confirmation request identifies the service requested by the first user to the second user.

12. The system of claim 1 wherein the service control logic includes an Internet server and the service is a restricted-access Web site.

13. The system of claim 1 wherein the second communication interface comprises an interface to a wireless mobile telephone network.

14. The system of claim 1 wherein the second communication interface comprises a short message entity.

15. The system of claim 1 wherein the access control logic includes SMS message interpretation logic.

16. The system of claim 1 wherein the user data storage includes confirmation codes, the access control logic being operational to compare the received confirmation message with a confirmation code in the user data storage.

17. The system of claim 1 wherein the access control logic is operational to send a second confirmation request to a second confirmation-channel address different from the first confirmation-channel address upon failure to receive a confirmation message from the second user.

18. The system of claim 1 wherein the access request message includes a user identifier.

19. The system of claim 1 wherein the user data storage includes user identifiers and confirmation-channel addresses associated with the user identifiers.

20. The system of claim 1 wherein the user data storage includes user identifiers and at least one confirmation-channel addresses associated with each user identifier.

21. The system of claim 1 wherein the confirmation code includes the confirmation-channel address of the second user.

22. The system of claim 1 wherein the confirmation-channel address is an unresolved address.

23. The system of claim 1 wherein the confirmation request includes a callback telephone number, the access control logic being operative to receive a confirmation message from the second user over a telephone call received at the callback telephone number.

24. An authorization system comprising:
an access communication channel;
a confirmation communication channel;
service control logic in communication with the an access communication channel for receiving through the an access communication channel an access request associated with a first user;
user data storage including a plurality of confirmation-channel addresses, wherein each confirmation-channel address is associated with one or more users, wherein a selected confirmation-channel address is associated with the first user, and wherein the selected confirmation-channel address is a confirmation-channel address of a second user different from the first user;
access control logic in communication with the confirmation communication channel for sending a confirmation request to the second user at the confirmation-channel address.

25. The system of claim 24, wherein the access control logic includes logic for intercepting request messages and for testing request messages for requests requiring authorization.

26. The system of claim 24, wherein the access control logic is operative to receive a confirmation message from the second user and to test the received confirmation message to determine whether the received confirmation message includes a valid confirmation code.

27. The system of claim 24, wherein the access control logic is operative to receive a confirmation message from the second user, the service control logic being operative to enable the first user access to a service only after the access control logic has received a confirmation message from the second user.

28. The system of claim 24, wherein the confirmation message is received by the access control logic through the second communication interface.

29. The system of claim 24, wherein the service control logic is operative to enable the first user access to a service only after the access control logic determines that the received confirmation message includes a valid confirmation code.

30. An authorization system comprising:
an interface connectable to a communication channel;
service control logic in communication with the communication interface for receiving through the first communication interface an access request including a user identifier of a first user;
user data storage including user identifiers and a plurality of confirmation-channel addresses associated with the user identifiers; and
access control logic in communication with the second communication interface for sending a confirmation request to a second user different from the first user at the confirmation-channel address associated with the user identifier of the first user.

31. The system of claim 30, wherein the access control logic includes logic for intercepting request messages and for testing request messages for requests requiring authorization.

32. The system of claim 30, wherein the access control logic is operative to receive a confirmation message from the second user and to test the received confirmation message to determine whether the received confirmation message includes a valid confirmation code.

33. The system of claim 30, wherein the access control logic is operative to receive a confirmation message from the second user, the service control logic being operative to enable the first user access to a service only after the access control logic has received a confirmation message from the second user.

34. The system of claim 30, wherein the service control logic is operative to enable the first user access to a service only after the access control logic determines that the received confirmation message includes a valid confirmation code.

35. An authorization system comprising:
a processor;
data storage;
a first communication interface connectable to an access communication channel;
a second communication interface connectable to a confirmation communication channel;
user data storage including user identifiers and associated confirmation-channel addresses; and
machine language instructions stored in the data storage and executable by the processor (i) to receive through the first communication interface an access request associated with a first user; (ii) to select a confirmation-channel address associated with a user identifier received in the access request; (iii) to send a confirmation request to a second user different from the first user at the selected confirmation-channel address; (iv) to receive a confirmation code from the second user through the second communication interface; and (v) to test the received confirmation code to determine whether the received confirmation code is a valid confirmation code.

36. The system of claim 35, further comprising machine language instructions stored in the data storage and executable by the processor to enable the first user to access the service only after the received confirmation message is determined to include a valid confirmation code.

37. A method for authorizing users of a service, comprising:
- receiving, over an access communication channel, a request for a first user to access a service;
- sending to a second user different from the first user, over a confirmation communication channel, a request for a confirmation code;
- receiving a confirmation message from the second user; and
- testing the confirmation message to determine whether the confirmation message includes a valid confirmation code;
- wherein the second user does not communicate with the first user between the time the second user receives the request and the time the second user sends the confirmation message.

38. The system of claim 37, further comprising enabling the user to access the service only after the confirmation message is determined to include a valid confirmation code.

39. The system of claim 37, further comprising providing a service to the first user only after the confirmation message is determined to include a valid confirmation code.

40. The system of claim 37, further comprising sending an authorization message to a service provider indicating that the user is authorized only after the confirmation message is determined to include a valid confirmation code.

41. The system of claim 37, wherein sending a request for a confirmation code comprises sending an SMS message.

42. The system of claim 37, wherein receiving a confirmation message comprises receiving an SMS message.

43. The system of claim 37, wherein receiving a request for a user to access a service includes receiving a user identifier.

44. The system of claim 37, wherein receiving a request for a first user to access a service includes receiving a user identifier, and sending a request for a confirmation code includes selecting a confirmation-channel address associated with the user identifier and sending the request for a confirmation code to the selected confirmation-channel address.

45. The system of claim 37, wherein receiving a request for a user to access a service includes receiving a user identifier, and testing the received confirmation message includes comparing the received confirmation message with a confirmation code associated with the received user identifier.

46. The system of claim 37, wherein receiving a service request includes intercepting request messages and testing request messages for requests requiring authorization.

47. The system of claim 37, wherein receiving a confirmation message includes receiving an instant messaging message.

48. The system of claim 37, further comprising sending an interstitial message to the first user after receiving the service request.

49. A method for authorizing users of a service, comprising:
- receiving from a service, over an access communication channel, a request for a first user to access the service;
- based on the identity of the first user, selecting, from among a plurality of users, a second user associated with the first user and different from the first user;
- sending to the second user, over a confirmation communication channel, a request for a confirmation code;
- receiving, over the confirmation communication channel, a confirmation message associated with the first user; and
- sending an authorization message including the confirmation code over the access communication channel to the service.

* * * * *